Dec. 2, 1958 M. J. HILER 2,862,834
METHOD OF COATING AN ARTICLE WITH A HEAT EXPANDABLE COATING
COMPOSITION AND COATING COMPOSITION THEREFOR
Filed Aug. 3, 1954
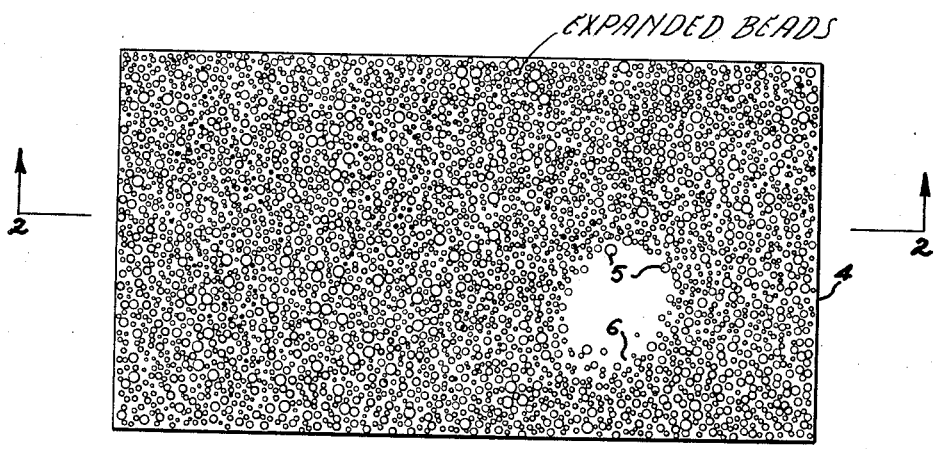
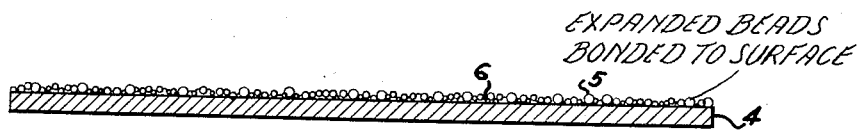
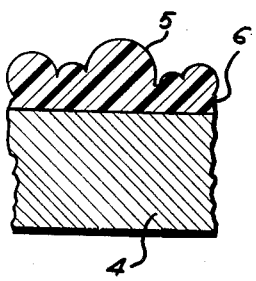
INVENTOR
MALVERN J. HILER
BY
ATTORNEYS United States Patent Office 2,862,834
Patented Dec. 2, 1958

2,862,834
METHOD OF COATING AN ARTICLE WITH A HEAT EXPANDABLE COATING COMPOSITION AND COATING COMPOSITION THEREFOR

Malvern J. Hiler, Dayton, Ohio, assignor to Midland Chemical Corporation, Dayton, Ohio, a corporation of Delaware Application August 3, 1954, Serial No. 447,550

11 Claims. (Cl. 117—41)

This invention relates to coating compositions and more particularly to a decorative coating composition and method of application.

The present invention provides a new type of coating composition which when applied and baked produces a novel expanded bead or popcorn type finish.

It is known heretofore to produce wrinkle-type coating compositions and films by the application of wrinkle drying oil, such as conjugated double bond oil admixed with resins, driers, and solvents, which upon application and drying form a wrinkle texture finish. The present invention does not require the use of conjugated double bond oils, relying principally upon the resinous constituent which is adapted to expand and form beads, thus producing a coating film having discrete closed cell structures dispersed over the surface. The coating composition upon application is baked to produce a protective coating of bead-like surface texture and which is tough and decorative.

According to the present invention a liquid coating composition is provided which contains discrete particles of a heat-expansible plastic material preferably the same being in the form of small beads or spheres of substantially uniform size and incorporated into a vehicle which may be of the "force-dry" or baking type. Upon application and heating of such a coating composition the plastic material expands or "pops" like popcorn, producing a coating film the surface of which is composed of a multitude of closely packed expanded beads, the beads being of irregular size or of substantially uniform diameter. The drawing illustrates diagrammatically such a popcorn type finish.

The texture of the expanded bead-like finish may be modified by the introduction of various pigments, resins, oils and the like, which do not interfere with the expansion or popping of the plastic constituent of the coating composition.

One of the principal objects of the invention is to provide a novel coating composition and method of finishing articles so as to produce a pleasing and decorative finish.

Another object of the invention is to provide a method of applying plastic coating composition, preferably in the form of small fine beads, which can be applied either in a mixture with paint or varnish, or paint oil vehicles, separately or together, so as to provide a coating film which may be subjected to heating or baking treatment to cause the fine beads of plastic material to expand and produce a finish having a uniform expanded bead surface texture.

In the following examples there is given various formulations which illustrate how the invention may be practiced, but it is understood that these examples are not limitative of the invention.

Example I

| | Parts by weight |
|---|---|
| Binder (phenol aldehyde resin urea-formaldehyde resin, latex, alkali metal silicate) | 10–50 |
| Solvent vehicle (methanol, water and lower alcohols) | 20–50 |
| Expansible resin beads (polystyrene or copolymers with ethylenic monomers or mixtures thereof) | 20–60 |

The binder and solvent vehicle is admixed, and then the resin beads stirred therein to produce a liquid coating composition of the desired consistency. The binder and solvent vehicle used should not rapidly attack or dissolve the resin beads otherwise the desired finish will not be attained. Preferably the binder and solvents used should be non-solvents for the resin beads. Water, aqueous alkali silicates (water glass) and the lower alcohols, e. g., methanol, ethanol, propanol are useful for this purpose.

In the case where aqueous alkali silicates are used, water constitutes the solvent vehicle and the expansible beads are dispersed therein by stirring the same together. In place of aqueous silicate, water dispersed emulsions of the latex type may be used as aforementioned.

The expansible resin beads are preferably polystyrene. Other expansible polystyrene resins may also be used such as described in U. S. Patents 2,532,242 and 2,532,243, and wherein a small amount of diphenyl 4,4'-di(sulfonylazide) is incorporated in the polymerized resin to produce a heat expansible resin.

In place of polystyrene expansible beads, there may be substituted other materials which may be copolymerized with styrene to produce resins in which suitable blowing agents are incorporated, the resin being polymerized in suspension to produce an expansible resinous bead useful for incorporation with a vehicle and utilized in practicing the invention. Resins useful for this purpose are alpha alkyl derivatives of styrene such as alpha-ethyl or methyl styrene, ring substituted derivatives of styrene, e. g., mono-di and tri chlorostyrenes, acrylic esters such as ethyl acrylate, methacrylic esters such as propyl methacrylate, acrylonitrile, methacrylonitrile, alpha beta ethylenically unsaturated dibasic acids and their derivatives, e. g., maleic, fumaric and itaconic acid, esters, amides, and nitriles thereof, diolefins, e. g., butadiene, isoprene, cyclopentadiene, etc.

As specific examples of compositions illustrating the invention and method of preparation and application, the following are given:

Example II

| | Parts by weight |
|---|---|
| Resin (coumarone-indene phenol formaldehyde resin) | 20 |
| Methanol | 40 |
| Polystyrene (heat-expansible beads) | 40 |

The resin and alcohol are admixed to form a solution. To this solution is then stirred in the polystyrene beads, the beads preferably having an average diameter of $\frac{1}{64}$ to $\frac{1}{6}$-inch. For spray application the preferred bead size is $\frac{1}{64}$ to $\frac{1}{32}$-inch.

Upon flowing a sample of the resultant composition on a metal panel and heating for 20 minutes at 230° to 240° F., a tough, abrasion resistant film was produced having a popcorn-like texture.

The heat-expansible polystyrene beads may be made by suspension polymerization of polystyrene or the like resin, as described in the U. S. patent to Grim 2,673,194, and wherein a small amount of a blowing agent is stirred therein, e. g., sodium bicarbonate, diazoaminobenzene, azo-diisobutyronitrile, sodium bicarbonate and amides, e. g., cyanamide, and the like substances which are heat-decomposable and evolves gas. The proportionate amount of the blowing agent used depends upon the particular resin and blowing agent employed as well as the degree of expansion desired. In general, the addition of from 0.5% to 10% by weight of the blowing agent, based on the weight of resin, is sufficient to produce the desired expansion. The proportionate amounts of resin and blowing agent may, of course, be varied to make use of a partial or complete expansion of the resinous beads at the temperature of heating or baking of the coating film to produce the decorative finish.

Other blowing agents may be used. For example, an alkyd with free end groups (hydroxyl or carbonyl) mixed with an isocyanate. The blowing agent is stirred into the suspension during making of the polystyrene beads so that the blowing agent is contained therein whereupon baking the coating composition the blowing agent reacts to give off carbon dioxide which expands to produce the popcorn texture finish.

The resin in Example II is a product sold by Neville Chemical Company, under trade name of Nevillac 10° and has a softening point ° C. (ball and shouldering ring) of 5–15, a melting point ° C. of 5–15 and is normally liquid.

Example III

| | Parts by weight |
|---|---|
| Resin (phenol-formaldehyde) | 25 |
| Ethanol | 25 |
| Polystyrene beads (Ex. II) | 25 |

The resulting coating composition is sprayed on panel and baked for 30 minutes at 230°–240° F. An adherent, tough finish is produced having an expanded bead surface texture.

In this example the resin used was a soft solid product sold by Neville Chemical Co. under trade name Nevillac soft having a softening point of 55–65° C., a melting point of 65–77° C.

Example IV

| | Parts by weight |
|---|---|
| Resin (phenol-formaldehyde coumarone-indene high-melting resin) | 25 |
| Methanol | 25 |
| Polystyrene beads (Ex. II) | 25 |

The coating composition was flowed onto a steel panel and baked for 30 minutes at 230°–240° F. to produce an expanded bead finish.

The phenol-formaldehyde modified resin employed was trade named Nevillac hard, and had a melting point of 83–95° C. and is solid.

Pigmented expandible bead compositions.

Example V

The formulation of Example II is repeated in which there is incorporated two parts by weight of a pigment paste consisting of titanium oxide pigment ground in boiled linseed oil, five pounds by weight pigment being ground on a ball mill per one gallon of oil.

The coating composition when applied and baked at 240° F. for 30 minutes produced a white expanded bead finish.

Example VI

In this example the formulation of Example II is repeated in which there is incorporated a pigment paste as described in Example V, except iron oxide is substituted for titanium oxide to produce a red expanded bead finish.

An alkali-silicate expanded bead composition is illustrated as follows:

Example VII

In this example aqueous alkali silicate was used as the binder as follows:

| | Parts by weight |
|---|---|
| Sodium silicate solution 50° Bé. | 50 |
| Polystyrene beads (Ex. II) | 50 |

The coating composition is applied to the surface to be finished and baked for 20 minutes at 230°–240° F. to produce the expanded bead coating film.

Other suitable aqueous silicate solutions may be used such as potassium silicate, and the Baume or concentration may vary between 30° Bé. and 70° Bé., a solution between about 40 and 60° Bé. however is preferred. Either the meta or ortho silicate may be utilized as desired.

Example VIII

A pigmented silicate formulation is made by repeating the composition of Example VII and adding a three parts by weight of the pigment paste consisting of titanium oxide ball mill ground in 30° Bé sodium silicate solution, using approximately six pounds of the oxide per gallon of silicate.

In the above examples the expansible or foamable polystyrenes are preferably those described in Kopper's Technical Bulletin, February 1954 (C–4–200T). The expansible polystyrene beads are free flowing and are of substantially uniform size. The beads are admixed with compatible resins dissolved in a solvent which will not dissolve the polystyrene. Upon the application of heat during baking the compatible resin forms a continuous film and fuses with the expansible polystyrene beads so as to anchor them and prevent expansion of the same beyond the confines of the coated surface.

The resins utilized preferably are of the phenolaldehyde type and which may be modified with rosin, drying oils, and the like. Phenol-formaldehyde resins, such as Amberol, Beckacite and the like are suitable. Other resins may be substituted or mixtures thereof used, as aforementioned, which resins are compatible with but do not dissolve the expansible polystyrene beads, the resin being non-tacky at room temperature but congealing or fusing to a tough continuous film during popping of the polystyrene under the temperature range of 230–275° F.

The particular size of the polystyrene beads may be varied, depending upon the type of finish desired. Further, the mixture of small and large size beads may be used and pigments incorporated to produce the desired color of the finish. In general a relatively soft low melting or liquid resin produces superior results to a higher melting solid resin.

The coating composition of this invention may be applied by the use of a spray gun as is conventional. The coating may also be applied by flow coating, brush application, or roller, as desired. Where the polystyrene bead particles are large a special oversized head is used for the spray gun so that the beads do not clog the gun.

After application, the preferred baking temperature is from approximately 225° F. to 300° F. for from 10 to 35 minutes. The temperature and length of baking will vary depending upon the particular composition of the coating and the desired pattern effect of the finish. The higher the temperature of the bake and time allowed for fusion and solidification of the coating the smaller or less distinct become the bead particles and the more securely are they anchored.

It has also been observed that the omission of a flash dry as some times employed in other coating compositions is unnecessary and in fact the uniformity and distinctness of the bead pattern texture is enhanced by avoiding an initial flash dry.

As a vehicle there also may be used a non-resinous type such as sodium silicate or the like alkali metal silicates such as potassium, lithium, etc. In the use of water or aqueous type silicate vehicles, there is no difficulty with the solvent tending to partially dissolve the polystyrene or plastic beads, or for the paint or lacquer material to minimize or counteract the popping or foaming action of the plastic beads.

In the drawing—

Figure 1 illustrates diagrammatically in elevation a panel coated with the coating composition of this invention;

Figure 2 illustrates in cross section the composition applied to a panel, as shown in Figure 1, the section being taken substantially on the line 2-2 and looking in the direction of the arrows;

Figure 3 is an enlarged fragmentary sectional view illustrating the general texture of the coating composition after application to a metal surface and drying.

Referring to the drawing, the expanded bead coating composition is shown as applied to a metal panel or metal surface, but this is merely exemplary of the invention as the coating composition may also be applied to wood, plastic or other solid surfaces which are to be finished.

The coating is applied to a panel such as metal, wood, etc., as shown at 4. The expanded beads 5 are bonded together by the resin or silicate vehicle 6 to provide a coating having an irregular bead-like finish. Where it is desired to provide a uniformly "popped" bead pattern, the resin beads are screened to a uniform size diameter.

A modified texture finish also may be formed by baking the coating film at a higher temperature, for example above 275° F. which will cause the beads to expand and collapse, forming a multi-crater effect. Preferably the temperature is kept below the point at which the beads are expanded to such an extent that they collapse by baking at lower temperatures, as described.

When an iridescent type of finish is desired, the pigmented composition may be modified by the addition of iridescent material. Furthermore, the pigmented composition may be modified by the addition of fillers or filler-pigments such as asbestine, silica, silex, whiting, china clay, diatomaceous earth, etc. The use of hydrous iron oxide colored pigment may also be used to produce a multi-toned effect.

It will be understood that while there have been given herein a number of specific examples of the coating composition and the method of applying and baking the coating composition in practicing the invention, it is not intended thereby to limit the same to the specific examples and details given. The invention accordingly may be modified to suit different conditions and uses and the material being coated, the same being contemplated as coming within the spirit and scope of the invention, and as more particularly pointed out in the appended claims.

What is claimed is:

1. A coating composition adapted for application to a surface and drying to an adherent, decorative film, said composition consisting of a liquid vehicle containing contiguous discrete beads of a heat-expansible material and a bonding agent for adhering said beads to the surface.

2. A coating composition adapted for application to a surface and drying to an adherent, decorative film, said composition consisting of a liquid vehicle containing contiguous discrete beads of a heat-expansible resin material and a bonding agent for adhering said beads to the surface.

3. A coating composition adapted for application to a surface and drying to an adherent, decorative film, said composition comprising a resinous vehicle containing contiguous discrete beds of polystyrene resin which beads are heat-expansible upon drying of the coating to produce a popcorn texture finish.

4. A coating composition adapted for application to a surface and drying to an adherent, decorative film, said composition comprising a mixture of resin comprising phenol-formaldehyde coumarone-indene, solvent and expansible resin beads.

5. A coating composition adapted for application to a surface and drying to an adherent, decorative film, said composition comprising a plurality of heat-expansible resin beads containing a blowing agent, a lower alcohol, and a bonding agent, said heat-expansible resin beads being in the form of contiguous discrete particles adherent to the surface coated therewith.

6. A coating composition adapted for application to a surface and drying to an adherent, decorative film, said composition comprising heat-expansible resin beads containing a blowing agent and sodium silicate as a binder for said heat-expansible resin beads adherent to the surface coated therewith.

7. A coating composition adapted for application to a surface and drying to an adherent, decorative film, said composition comprising phenol-formaldehyde, coumarone indene resin, short chain aliphatic alcohol, and polystyrene beads, said beads containing a blowing agent to cause expansion of said beads when the same are heated.

8. A coating composition adapted for application to a surface and drying to an adherent, decorative film, said composition consisting of a liquid vehicle containing contiguous discrete beads of a heat-expansible resin containing a blowing agent and admixed with pigment and a bonding agent, said composition upon application and drying of the coating producing a popcorn texture finish.

9. A coating composition adapted for application to a surface and drying to an adherent, decorative film, said composition consisting of liquid sodium silicate containing contiguous discrete beads of heat-expansible resin material containing a blowing agent, said composition upon application and drying of the coating producing a popcorn texture finish.

10. A method of finishing an article comprising the steps of applying a coating composition thereto, which composition contains heat-expansible discrete beads containing a blowing agent and a binder therefor, to provide a film of the coating composition thereover, and baking the resultant coated article at a temperature of between about 210-275° F. for a time sufficient to expand said heat-expansible discrete beads of resin containing a blowing agent and produce a popcorn-like texture finish.

11. A method of finishing an article comprising the steps of applying a coating composition thereto, which composition contains heat-expansible polystyrene beads containing a blowing agent and a binder therefor, to provide a film of the coating composition thereover, and baking the resultant coated article at a temperature of between about 210-275° F. for a time sufficient to expand said heat-expansible beads and produce a popcorn-like texture finish.

References Cited in the file of this patent

UNITED STATES PATENTS

| | | |
|---|---|---|
| 2,246,898 | Sayre | June 24, 1941 |
| 2,254,072 | Jenkins | Aug. 26, 1941 |
| 2,332,031 | Toulmin | Oct. 19, 1943 |
| 2,442,940 | Staudinger | June 8, 1948 |
| 2,681,321 | Stastny | June 15, 1954 |